(12) United States Patent
Jesse et al.

(10) Patent No.: US 8,371,421 B2
(45) Date of Patent: Feb. 12, 2013

(54) BRAKE BAND HOLDER

(75) Inventors: Mark Jesse, Hamburg (DE); Carsten Ziegs, Hamburg (DE)

(73) Assignee: DOLMAR GmbH, Hamburg (DE)

( * ) Notice: Subject to any disclaimer, the term of this patent is extended or adjusted under 35 U.S.C. 154(b) by 1099 days.

(21) Appl. No.: 11/755,140

(22) Filed: May 30, 2007

(65) Prior Publication Data
US 2008/0128228 A1    Jun. 5, 2008

(30) Foreign Application Priority Data
May 31, 2006  (DE) ............... 20 2006 008 733 U

(51) Int. Cl.
  *F16D 51/00*  (2006.01)
  *F16D 9/00*   (2006.01)
(52) U.S. Cl. ....................... 188/77 W; 192/80
(58) Field of Classification Search ............. 188/77 R, 188/77 W; 192/17 R, 80, 81 C
  See application file for complete search history.

(56) References Cited

U.S. PATENT DOCUMENTS

| | | | | |
|---|---|---|---|---|
| 2,641,338 A * | 6/1953 | Findley | ............... | 188/137 |
| 3,828,895 A * | 8/1974 | Boaz | ............... | 188/77 R |
| 4,055,935 A * | 11/1977 | Malion et al. | ............... | 56/10.3 |
| 4,310,972 A | 1/1982 | Isberg et al. | | |
| 4,324,045 A * | 4/1982 | Hoppner et al. | ............... | 30/381 |
| 4,420,885 A * | 12/1983 | Todero | ............... | 30/381 |
| 4,593,796 A * | 6/1986 | Farquhar | ............... | 188/77 R |
| 4,651,423 A * | 3/1987 | Grogan | ............... | 30/382 |
| 5,984,054 A * | 11/1999 | Martinsson | ............... | 188/77 R |
| 6,687,968 B2 * | 2/2004 | Willerscheid et al. | ....... | 29/421.1 |
| 2004/0086325 A1 * | 5/2004 | Friesen et al. | ............... | 403/150 |

FOREIGN PATENT DOCUMENTS

| | | |
|---|---|---|
| DE | 1 809 746 | 7/1970 |
| DE | 38 02 488 C2 | 8/1989 |
| DE | 196 35 120 C1 | 4/1998 |
| DE | 198 18 640 C2 | 6/2000 |
| DE | 199 31 251 A1 | 1/2001 |

* cited by examiner

*Primary Examiner* — Melody Burch
(74) *Attorney, Agent, or Firm* — Kelly & Kelly, LLP

(57) ABSTRACT

A braking device is provided for braking or immobilizing a shaft in a work tool, particularly a saw chain, hedge shears or the like. The braking device has a brake band that at surrounds at least part of an area of the shaft, in which the brake band forms an effective plane, and two brake band holders with which the brake band may be placed under tension and released, in which at least one brake band holder is constructed movably, and in which a movable brake band holder is arranged with little space requirement in the braking device. At least one brake band holder is mounted outside the effective plane of the brake band so that it is rotatable about the axis of rotation or about an approximately parallel axis or shaft and/or so that it is able to be moved in a linear direction on a plane that is approximately orthogonal with the shaft.

16 Claims, 7 Drawing Sheets

BRAKE BAND HOLDER

TECHNICAL FIELD

The present invention relates to a braking device for braking or immobilising a shaft for a work tool, which may consist in particular of a saw chain, a shears blade, a rotary head or similar. A braking device of such kind may be used for example in a housing of a hand-held implement such as a chainsaw, hedge trimmer, rotary mower or similar. In this context, the work tool in question must be slowed and stopped rapidly to prevent any possibility of injury to the operator of the implement. To this end, the braking device is equipped with a brake band that at least partly surrounds an area of the shaft, the brake band forming an effective plane. In this context, the shaft is understood to refer to the shaft of the motor or tool. The braking device is also equipped with two brake band holders, via which the brake band may be tensioned, and of which at least one brake band holder is constructed movably so that tension may be applied to the brake band thereby.

RELATED ART

In general, the principle of a braking device with a brake band is explained in German Patent No. DE 38 02 488 C2. It is also known to use such braking devices not only in electrically powered hand-held implements, but also in hand-held implements powered by an internal combustion engine. In the case of hand-held implements that are powered by a combustion engine, however, a clutch is also used, thereby ensuring mechanical separation of the implement and the engine. Of course, such a clutch may also be used in electrically powered hand-held implements.

Many braking devices with brake bands are known from the related art. For example, German Patent Nos. DE 199 31 251 A1 and DE 196 35 120 C1 disclose a braking device in which the brake band is mounted in its effective plane between a fixed and a movable brake band holder. The movable brake band holder is mounted in the effective plane of the brake band in order to produce the required tensile stress in the brake band. However, this is only possible if there is sufficient lateral distance between the movable brake band holder and the shaft. Consequently, this mounting of the movable brake band holder occupies a large space in the effective plane.

It is further known from the related art to use a brake band device not only as a safety brake but also as a run-out brake. One such solution is disclosed in German Patent No. DE 196 18 640 C2, for example. The safety brake serves to decelerate the work tool rapidly when a safety lever, handle or similar is actuated. In contrast, the run-out brake is designed to prevent the tool from running on or limit such movement after the on switch has been released or when the tool has been switched off. Both the safety brake and the run-out brake serve to reduce the risk of accidents that are associated with mechanically driven work tools.

BRIEF DESCRIPTION OF THE INVENTION, SOLUTION, ADVANTAGES

The object of the present invention is to provide a braking device having a brake band in which a movable brake band holder occupying little space is mounted in the braking device. The mounting of the movable brake band holder must be of simple construction.

A braking device having the features of claim 1 is suggested to solve this object.

In the braking device according to the invention, it is provided that at least one brake band holder is mounted outside the effective plane of the brake band, and/or so as to be rotatable about the shaft. Accordingly, it is possible to locate the mounting of the movable brake lever close to or even rotatably about the shaft. This in turn enables considerable space to be saved in the effective plane of the braking device.

Advantageous constructions of the braking devices are described in dependent claims 12 to 16.

In order to construct the most effective braking device possible, the shaft may include a brake drum, so that the braking surface between the shaft and the brake band may be increased considerably. The brake drum provided is connected to the shaft, and such a brake drum is at least partially surrounded by the brake band. To this end, the shaft and the brake drum may be constructed from the same material. It is also conceivable for the brake drum to be constructed so as to be replaceable on the shaft, to reduce repair costs when the brake drum becomes worn. The brake drum may also have an axial hollow formation so that overall it is cup-shaped, and the brake band passes around the outside of the brake drum. A brake drum that is constructed in this way may also be used as a component for a clutch, particularly a centrifugal clutch. In this case, the inside of the axial hollow formation may serve as the effective surface for the clutch.

In a first embodiment of the braking device according to the invention, an axis of rotation of the movable brake band holder is arranged coaxially with the axis of rotation of the shaft. Accordingly, the brake band holder is mounted so as to be radially rotatable about the shaft. The actual mounting of the movable brake band holder may thus be provided below the brake drum. This in turn enables a highly compact mounting for the movable brake band holder.

On the other hand, in a second embodiment of the braking device the movable brake band holder is mounted close to the shaft and axially offset (with respect to the shaft). In this case, the mounting is also advantageously located below the brake drum. The actual mounting in this case has the form of a linear track, which may be curved or straight. The mounting for the movable brake band holder is thus not in the effective plane of the brake band.

In order to prevent the work tool from being activated inadvertently, the braking device is automatically set in a rest position, in which the shaft is held so that it is unable to rotate. The necessary tension for this is provided by a spring force acting directly or indirectly on the movable brake band holder. In this way, the movable brake band holder is subjected to tension by a spring. It is only possible for the work tool to function when the braking device is in the operating position that allows the shaft to rotate. In this operating position, the brake band itself is not under tension. In this context, the force of the spring on the movable brake band holder is counteracted by strain relief. This strain relief in turn serves to overcome the spring force, so that the brake band holder is moved in its mounting. When the implement is switched on, strain relief normally takes place at the same time so that the work tool is able to operate. Independently of this, a safety mechanism may render the strain relief ineffective, so that the powered work tool is decelerated or immobilised even when the implement is switched on. Thus the present braking device may serve as a safety brake and/or as a run-out brake.

In order to enable the movable brake band holder to be mounted in a position offset from the effective plane of the brake band, it is equipped with a mounting base and an attachment lug thereon that is axially offset relative to the brake band holder. The mounting base and the attachment lug are constructed as a single piece. Reinforcing ribs may advantageously be provided that enable the transfer of strong forces or turning moments. In order to avoid high stresses in the brake band holder, not only the spring but also the strain relief may also act on the attachment lug.

According to the first embodiment of the braking device according to the invention, a swivel guide for the movable brake band holder is arranged so as to be coaxial with the shaft. The swivel guide includes a swivel ring and a swivel bearing, the swivel ring being provided as a mounting base on the movable brake band holder and functioning as a counter bearing in cooperation with the swivel bearing. The swivel bearing may be located in fixed manner on the housing of the braking device. It is also conceivable for the swivel bearing to be conformed directly in the housing. An additional ball or roller bearing or bearing bush or similar may also be provided between the movable brake band holder and the housing to minimise friction forces.

According to an advantageous embodiment, it is provided that movable brake band holder is retained in a swivel guide by means of a bayonet connector. This enables the movable brake band holder to be mounted without tools. The construction method associated with this allows the brake band holder to be designed as a single part, thereby reducing the number of components. It is possible to switch the brake band holder from its mounting position to its working position via the bayonet connector.

In the second embodiment of the brake band device, the movable brake band holder is mounted in the area of the shaft via a linear track. The linear track provided for this purpose includes a sliding section and a bearing pin. In this case, the sliding section may be provided on the movable brake band holder as a bearing part that is mounted in sliding manner on at least one bearing pin serving as the counter bearing. The bearing pin of the counter bearing may be constructed integrally with the housing of the braking device. Two or more bearing pins may be provided to achieve optimum guidance with this linear guide. It is also conceivable that a bearing pin may have an essentially rectangular cross section (with rounded corners). This assures better guidance of the sliding section. It should also be noted here that the sliding section is not limited to a straight guidance means, it may also have and arcuate or other course. It is also conceivable for the bearing pins to be provided as threaded pins in the housing of the braking device.

In a special design of the invention, the movable brake band holder is retained directly or indirectly on the housing of the braking device in the axial direction of the shaft. A closed rotary or linear guide is used for this purpose. In this case, the mounting base of the movable brake band holder is furnished with at least one guidance means that cooperates in positive locking manner with a mating guidance means of the counter bearing. The guidance means of the mounting base may then be conformed as a projection. The mating guidance means of the counter bearing may be conformed correspondingly as a groove in which the projection is retained in positive locking manner. It should be noted that the guidance means and the mating guidance means are reversible, so that the groove may be provided on the mounting base and at least one projection may be provided on the counter bearing.

In order to ensure that the movable brake band holder may be assembled on the braking device with the guide closed, cutaways are provided in the groove of the counter bearing means, with which the projections of the guidance means may engage. When the mounting base is twisted or moved relative to the counter bearing, the movable brake band holder is mounted in positive locking mounting with a closed guide.

In a further variant of the braking device according to the invention, both brake band holders may be constructed so as to be movable. In this case, it is conceivable to dispose both brake band holders so as to be axially movable about the shaft.

To provide an inexpensive braking device construction, the movable, particularly rotatable and/or slidable brake band holder, may be constructed from a cast part, particularly a precision cast part. This cast part may be made from an aluminium die-cast part. To economise on material and weight, cutaways may be provided in the movable brake band holder, providing the brake band holder with a sandwich-like construction.

The present invention is also directed to a hand-held implement as recited in claim 18, in which the braking device according to the invention as recited in claims 1 to 17 is provided. This hand-held implement has a particularly small installation space for the braking device.

BRIEF DESCRIPTION OF THE DRAWING

In the following, the invention will be described in greater detail with reference to the attached drawing and the various embodiments. In the drawing.

PREFERRED CONSTRUCTION METHOD OF THE INVENTION

Figure 1:
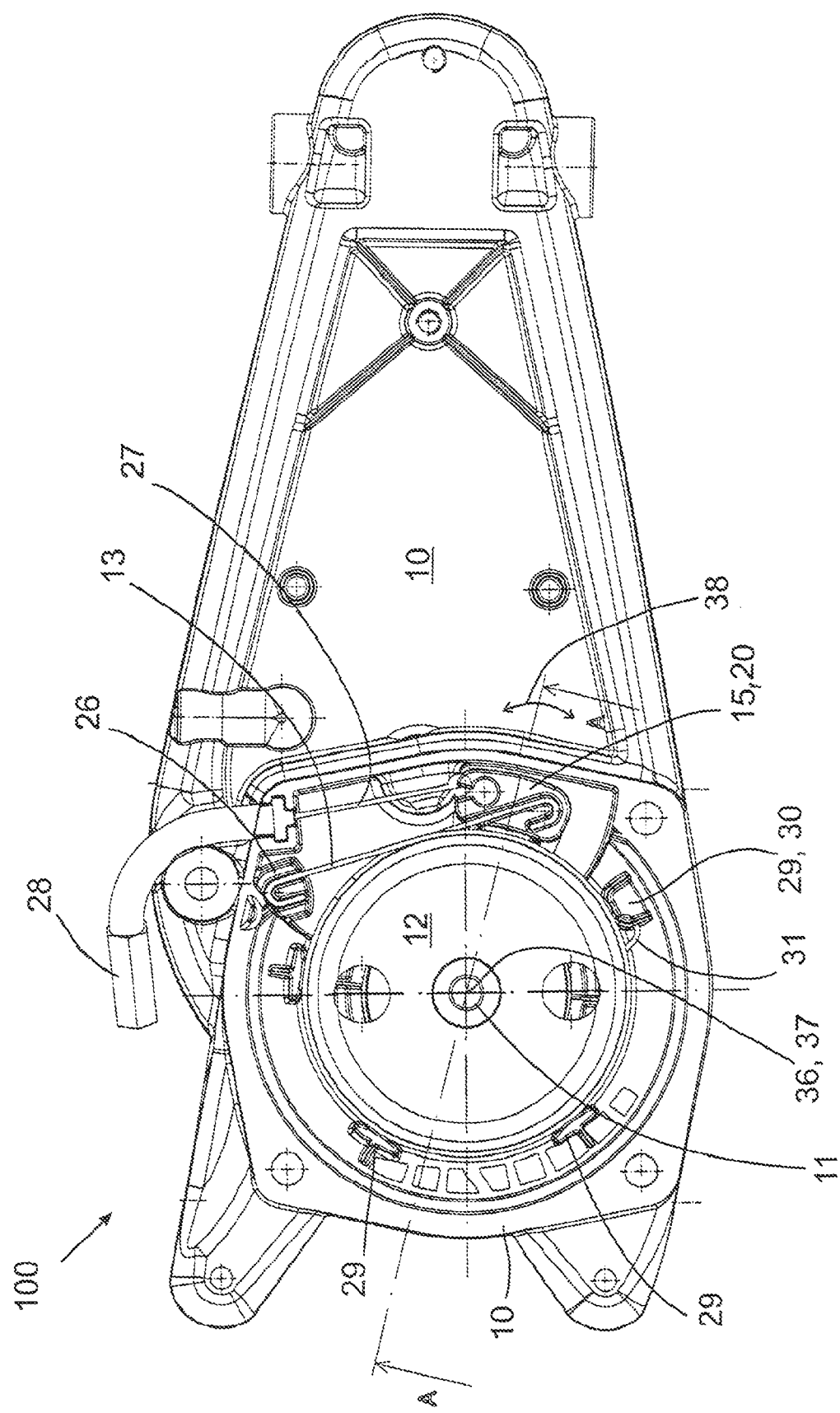
FIG. 1 is a plan view of a first embodiment of the braking device when mounted, with a brake band holder mounted so as to be rotatable about the drive shaft.

In FIG. 1, braking device 100 is represented with its housing 10. The associated hand-held implement with its motor and activation unit is attached to this housing. However, braking device 100 is shown without these parts for the sake of simplicity. In FIG. 1, braking device 100 according to the invention is in its rest position, in which brake band 13 is subjected to tension by movable brake band holder 15. In order to obtain a braking effect on shaft 11, brake band 13 is wound round brake drum 12, which is connected to shaft 11. To ensure that brake band 13 remains essentially in place in the working position as well, radial guides 29 are provided circumferentially about brake drum 12. At least one axial guide 30 is also provided and cooperates with a bulge 31 in brake band 13. In the present case, this axial guide 30 also serves as radial guide 29 for brake band 13. It is also shown that brake band 13 is place under tension by fixed brake band holder 26 and movable brake band holder 15. Movable brake band holder 15 is rotated by a torsion spring—not shown— clockwise about its axis of rotation 37, which is identical with the axis of rotation 36 of shaft 11. The torsion spring may also be dispensed with if sufficient tension is inherent in or produced by the spring-elastic brake band itself. In order to relieve the tension of brake band 13, strain relief 27 engages with movable brake band holder 15, particularly with mounting base 20 (see FIG. 6), close to retainer 22 of brake band 13. Seating 21 (see FIG. 6) for strain relief 27 is located on mounting base 20, very close to retainer 22 for brake band 13, for this purpose. Strain relief 27 itself may consist of a Bowden cable or a linkage, which extends out of housing 10 via a retaining element 28, for example.

If the operator now pulls on strain relief 27, movable brake band holder 15 rotates clockwise inside housing 10 against the spring force or the force inherent in the brake band, reducing the tensile stress in brake band 13. The radial guides 29 and axial guides 30 for brake band 13 described previously are provided to prevent brake band 13 from slipping off of brake drum 12 in this operating position.

Figure 2:
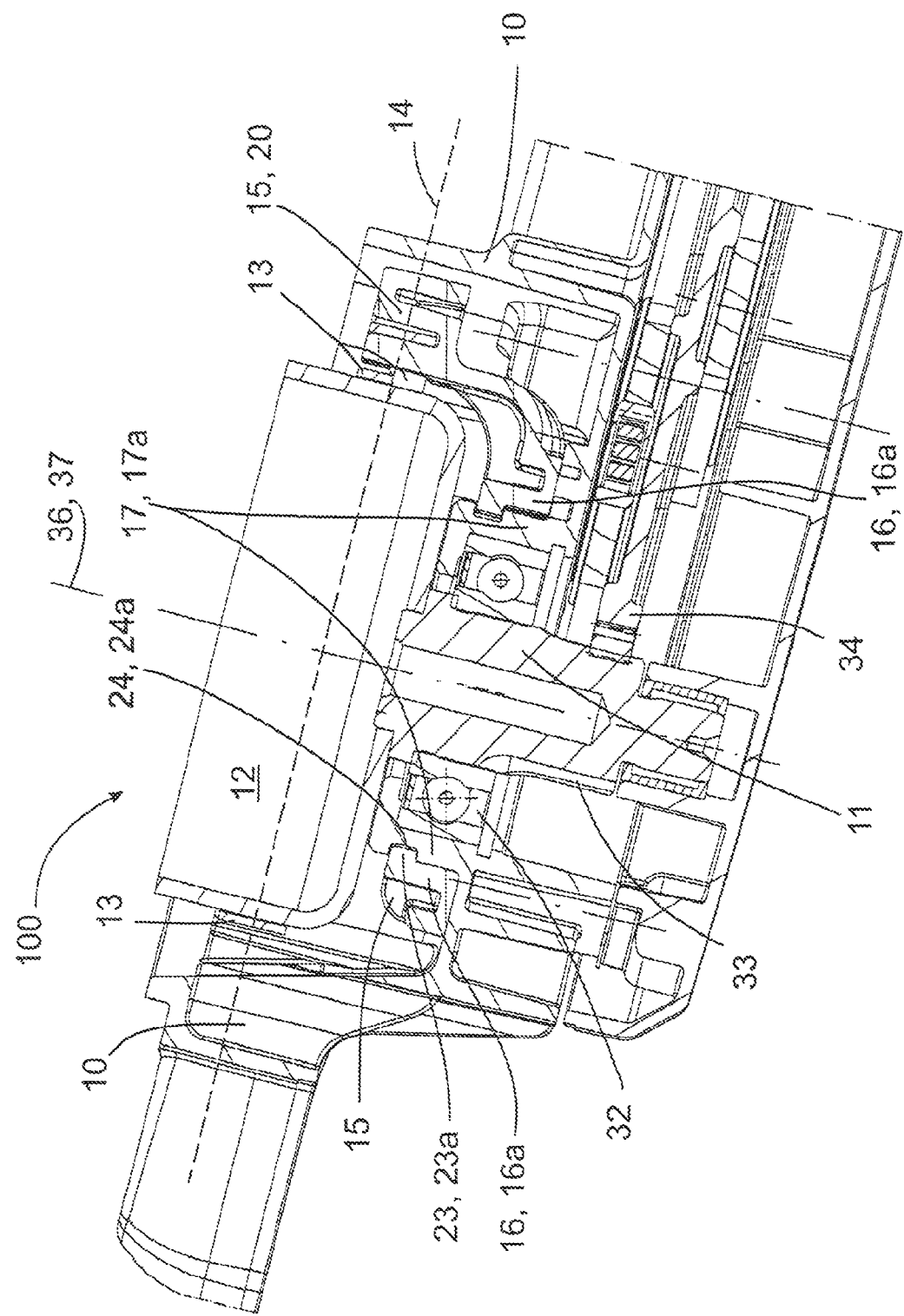
FIG. 2 is a cross section along line A-A through the braking device of FIG. 1.

FIG. 2 shows a cross section A-A through braking device 100. In this context, brake drum 12 is disposed in non-rotating manner on shaft 11. Here, the two parts described earlier form a single unit, which is supported in rotating manner on shaft 11 in housing 10 via a bearing 32. The actual driving torque from an electric motor or combustion engine is applied to shaft 11 through brake drum 12, particularly the inside of axial hollow formation of brake drum 12. Brake band 13 is wrapped around the outside of brake drum 12. In order to ensure that brake band 13 exerts only radial forces, and as far as possible no axial forces on brake drum 12, brake band 13 is arranged in an effective plane 14. To this end, brake band 13 is narrower in the overlapping area. The one end of brake band 13 is retained in fixed brake band holder 26, while the other end is retained in movable brake band holder 15, particularly by retainer 22. Retainer 22 is disposed in effective plane 14 so that it does not transfer any axial forces to brake drum 12. In order to keep the space requirement for mounting break band holder 15 to a minimum despite this, movable brake band holder 15 has an axially offset mounting base 16 for mounting lug 20. In the present case, this mounting base 16 consists of a swivel ring 16a, which is constructed with a swivel bearing 17a as counter bearing 17. Counter bearing 17 and swivel bearing 17a constitute an integral area of housing 10, the outside of which serves to support movable brake band holder 15, and the inside of which seats bearing 32 for shaft 11.

As may also be seen, decelerating or immobilising brake drum 12 stops shaft 11, which is furnished with gearing 33 on the side facing away from brake drum 12.

Additional guidance means 23, which are configures a protrusions 23a, are provided to secure movable brake band holder 15 axially on counter bearing 17 or swivel bearing 17a. These guidance means 23 or protrusions 23a cooperate with mating guidance means 24 or a groove 24a in counter bearing 17 or swivel bearing 17a.

Figure 3:
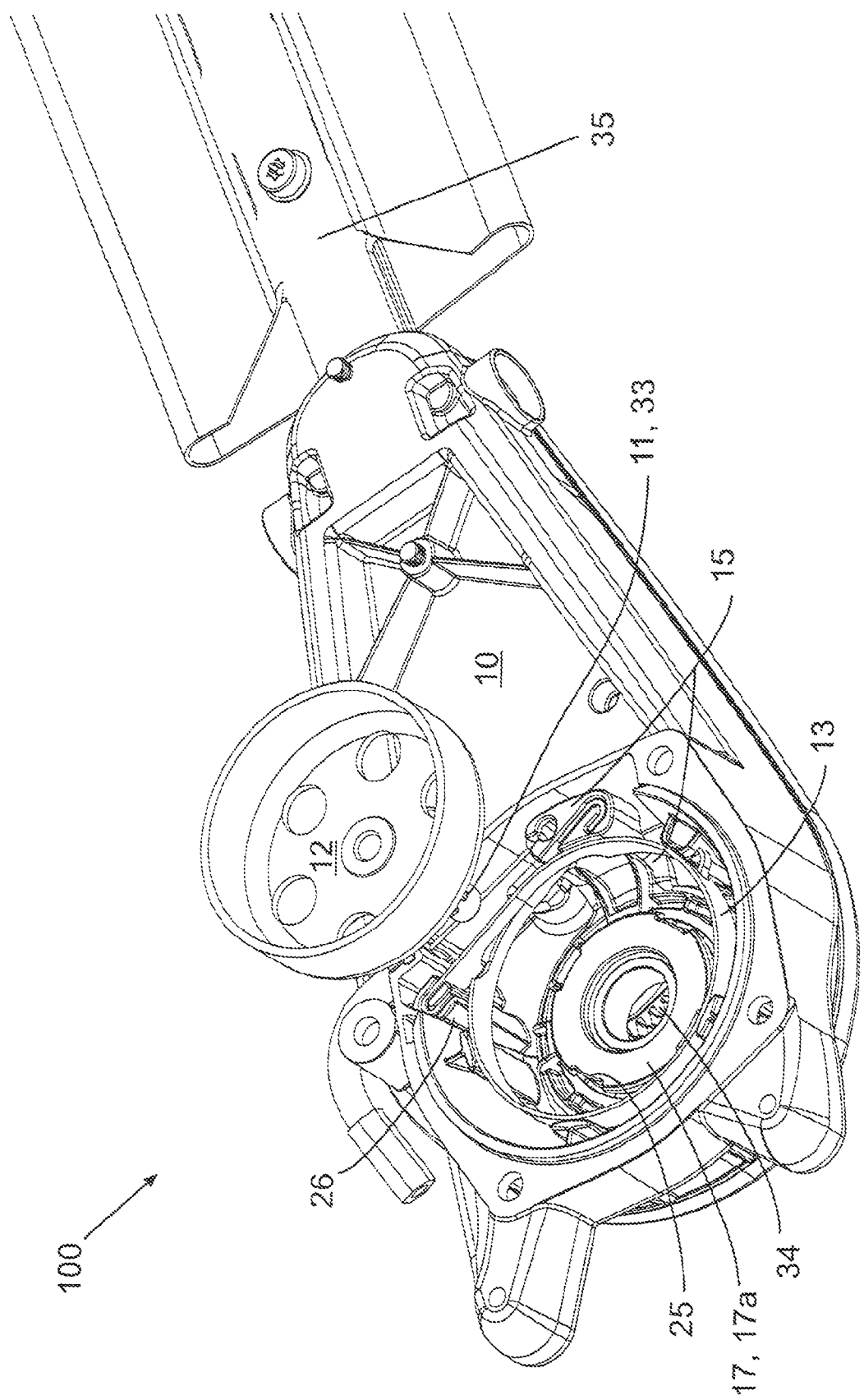
FIG. 3 is an exploded three-dimensional diagram of the braking device of FIG. 1.

FIG. 3 shows a three-dimensional exploded view of braking device 100 according to the first embodiment. In this case, rotatable brake band holder 15 is already mounted on counter bearing 17 on the housing side via its mounting base 16. Brake band holder 15 may be subjected to clockwise spring tension for example by a torsion spring below movable brake band holder 15. In FIG. 3, brake band 13 has already been mounted in movable and fixed brake band holders 15, 26. Rotatable brake band holder 15 may be rotated counterclockwise by strain relief 27, which has also been fitted already, to make it easier to fit shaft 11 with brake drum 12 afterwards.

Figure 4:
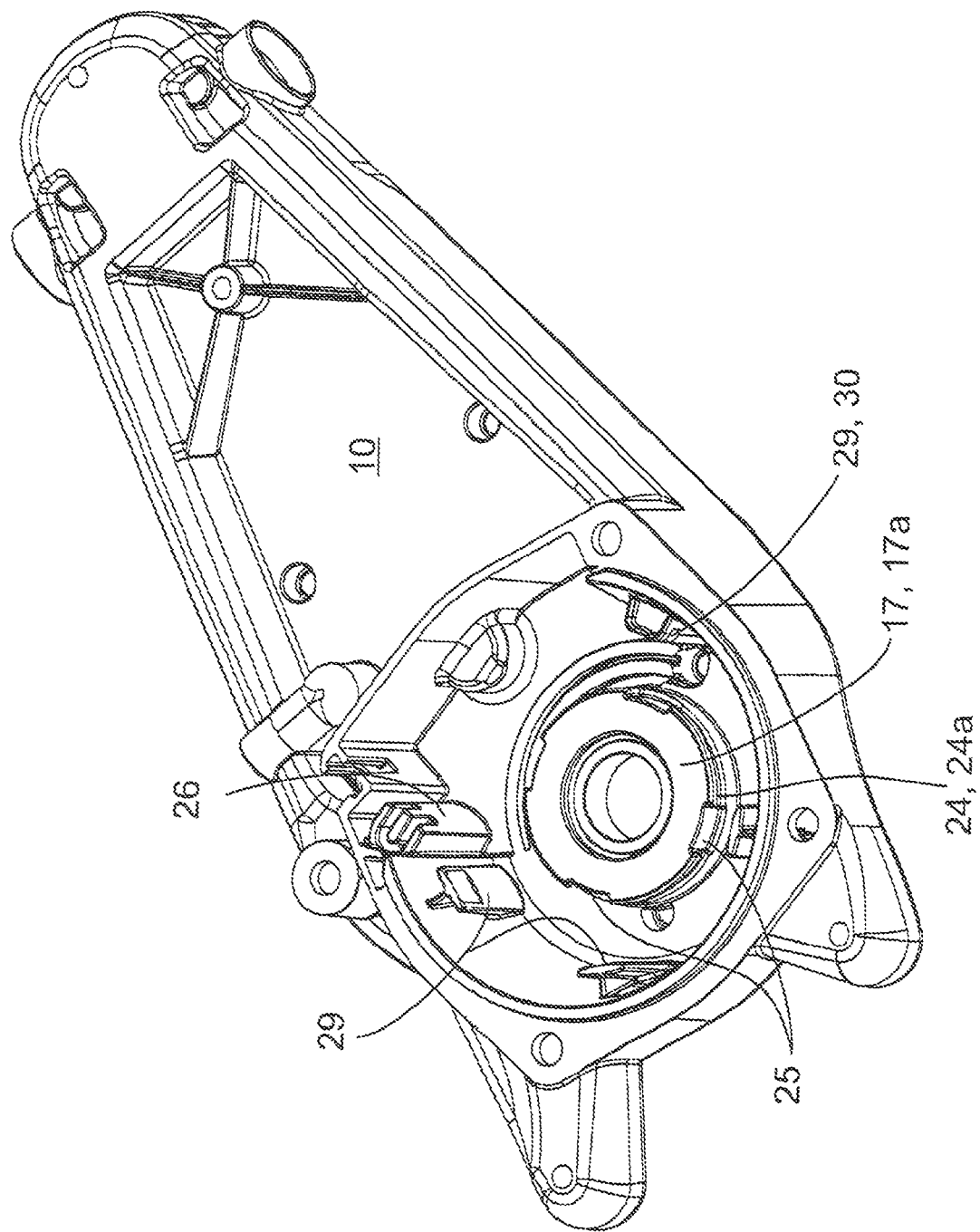
FIG. 4 is a three-dimensional diagram of the housing of the braking device of FIG. 1.

FIG. 4 clearly illustrates how movable brake band holder 15 with its guidance means 23 or protrusions 23a may be mounted in mating guidance means 24 or groove 24a. Radial cutaways 25 are provided in counter bearing 17 or swivel bearing 17a for this purpose. These cutaways 25 allow movable brake band holder 15 to be pushed axially over counter bearing 17 or swivel bearing 17a, and secured axially in positive locking manner on counter bearing 17 by twisting clockwise or counterclockwise. Such a swivel guide is also known as a bayonet connector.

Figure 5:
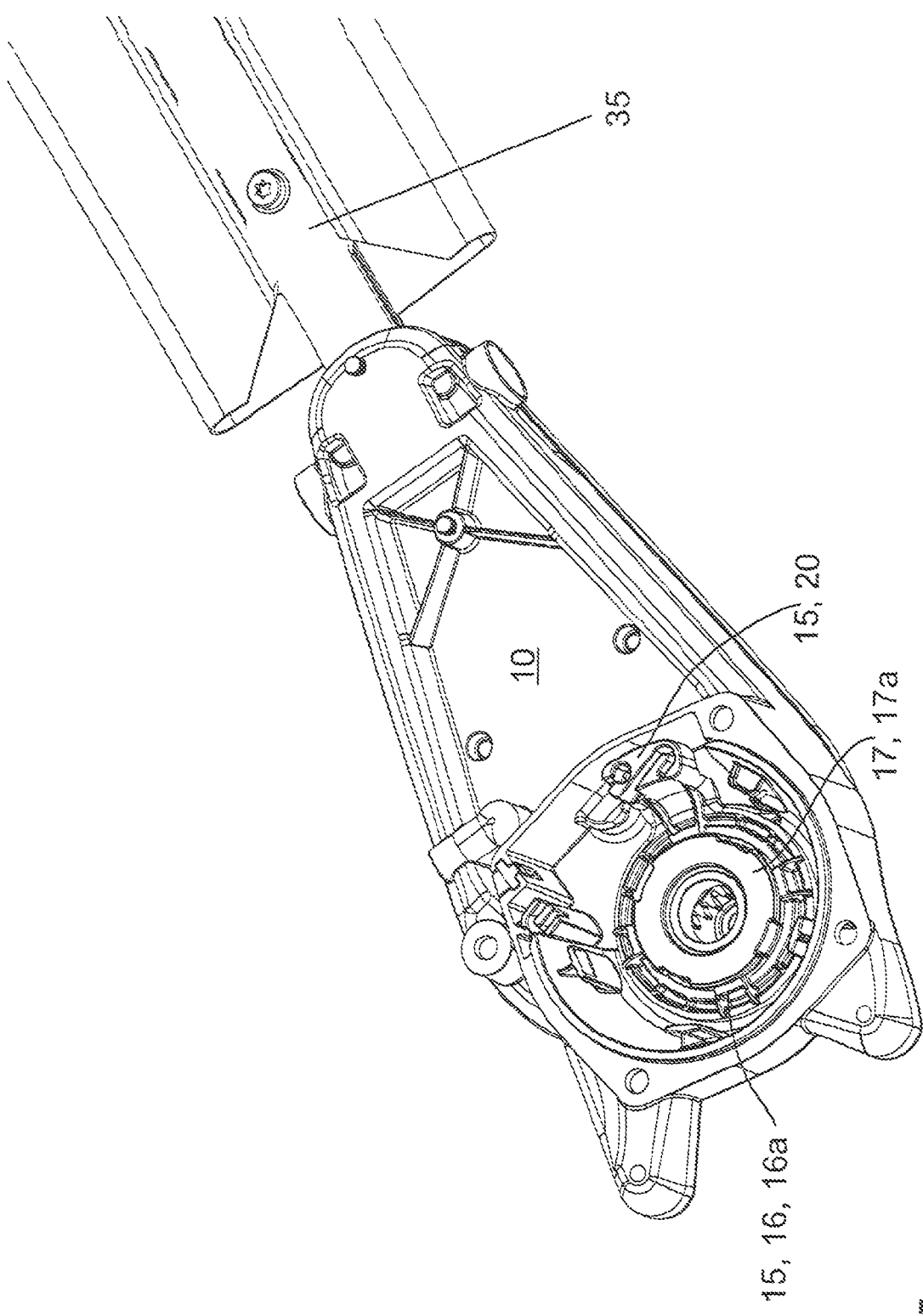
FIG. 5 is a three-dimensional diagram of the housing of FIGS. 1-4 with an implement attached and a movable brake band holder mounted, but without a shaft and brake drum.

FIG. 5 shows a three-dimensional view of housing 10 with an implement 35 attached thereto, in this case a hedge shears blade. The actual blade of the hedge shears is covered in FIG. 5 by a protective sheath. With this work tool 35, the rotary movement of shaft 11 is converted to a linear movement of the shears blade by an eccentric gear train. In the housing in FIG. 5, rotatable brake band holder 15 has already been mounted on swivel bearing 17a with swivel ring 16a.

Figure 6:
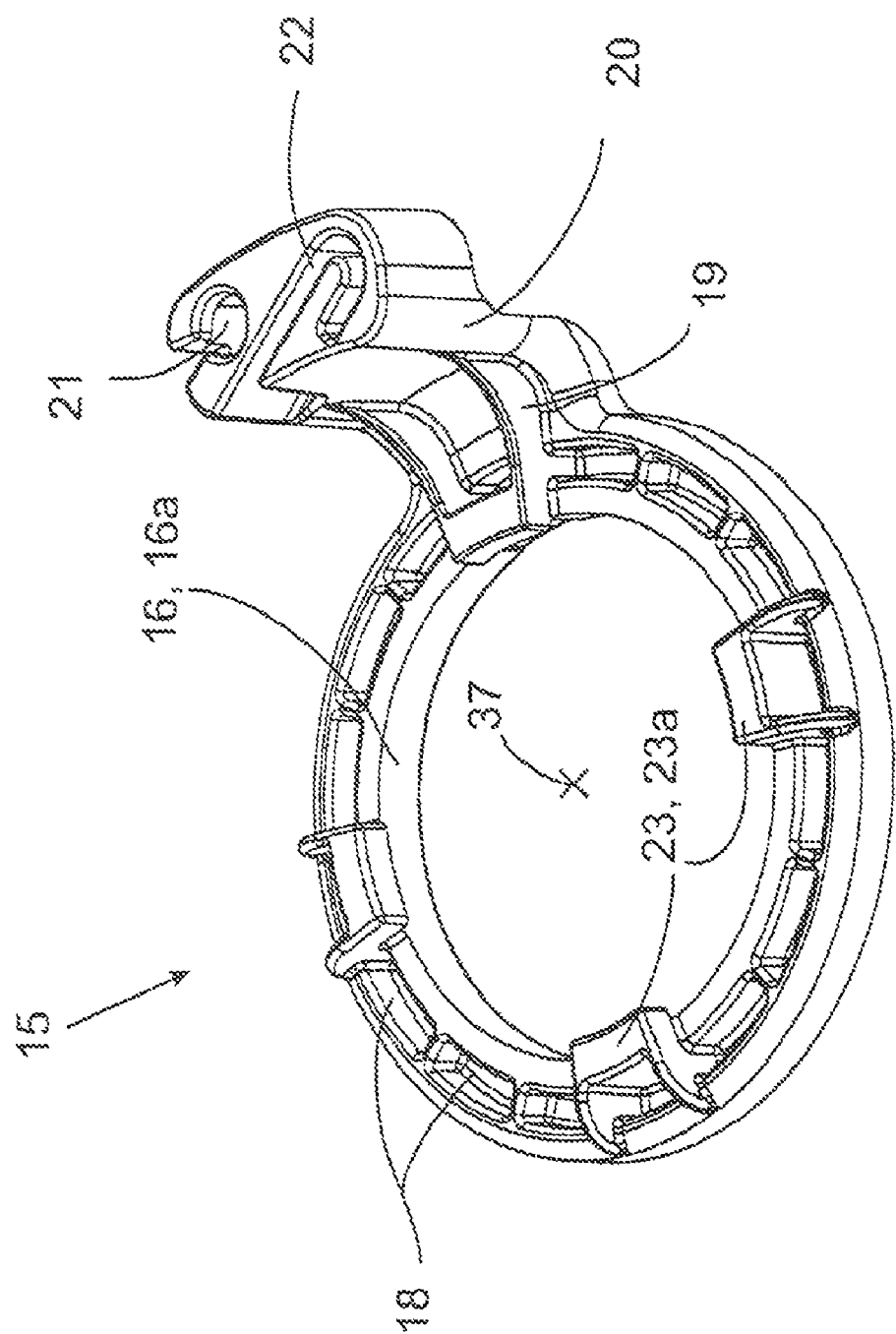
FIG. 6 is a three-dimensional diagram of the annular, movable brake band holder of FIG. 1.

FIG. 6 is a three-dimensional representation of a rotatable brake band holder 15 on its own. This brake band holder 15 has a mounting base 16 and an attachment lug 20. Mounting base 16 is offset axially with respect to attachment lug 20 so that brake band holder 15 may be mounted outside effective plane 14 of brake band 13. Mounting base 16 is constructed integrally with and from the same material as attachment lug 20. To improve the overall stability of the brake band holder 15, additional reinforcing ribs 19 are provided in the transition between mounting base 16 and attachment lug 20. Attachment lug 20 itself includes retainer 22 for the brake band 13 and seating 21 for strain relief 27. Seating 21 and retainer 22 are located close to each other. Mounting base 16 itself is constructed as a swivel ring 16a with guidance means 23, which are in the form of protrusions 23a. These guidance means 23 or protrusions 23a ensure that movable brake band holder 15 is secured axially on swivel bearing 17a. In this context, at least two guidance means 23 are advantageously provided, and cooperate with one or more mating guidance means 24. In the brake band holder 15 shown, a total of four protrusions 23a are arranged evenly about the circumference of swivel ring 16a. These protrusions 23a are all arranged in one plane, so that only one mating guidance means 24 or groove 24a needs to be provided in counter bearing 17 to accommodate them.

Figure 7:
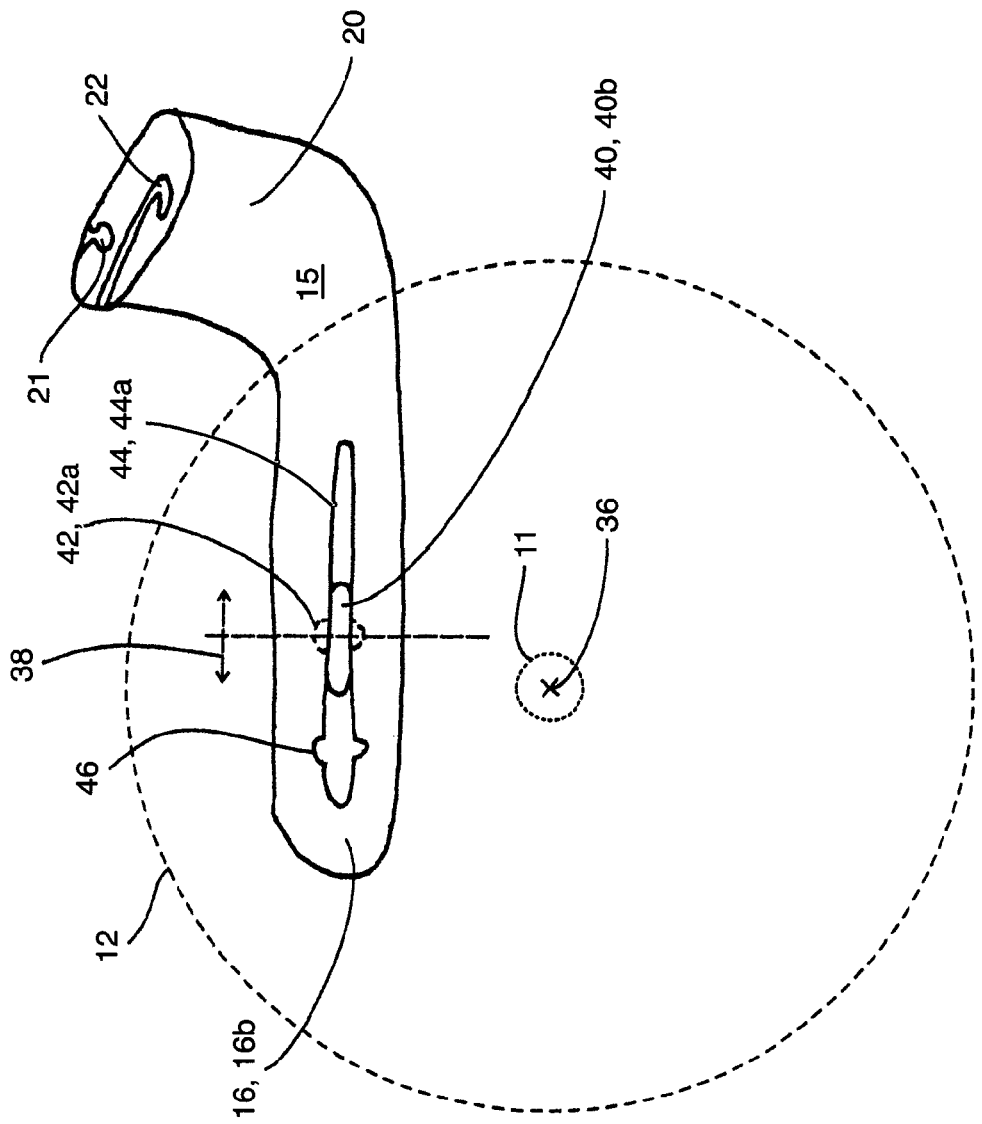
FIG. 7 is a schematic diagram of a different movable brake band holder with a linear guide.

FIG. 7 is a purely schematic representation of a second embodiment of the braking device 100 according to the invention, in which a brake band holder 15 movable in linear direction is used. This brake band holder 15 includes a sliding section 16b as mounting base 16 and an axially offset attachment lug 20. Attachment lug 20 may have essentially the same construction as the attachment lug 20 of FIGS. 1-6 showing the first embodiment of the invention.

FIG. 7 also shows an outline of brake drum 12, under which the brake band holder 15 that is movable in linear direction is supported. For this purpose, brake band holder 15 includes linear sliding section 16b, which cooperates with at least one bearing pin 40b as counter bearing 40. Brake band holder 15 is movable horizontally in its linear guide in the direction of arrow 38. Movable brake band holder 15 is mounted in a similar manner to the rotatable brake band holder 15 of FIGS. 1-6. Linear sliding section 16b also forms a closed guide together with bearing pin 40b on the housing side. Guidance means 42, particularly protrusions 42a, are provided on bearing pin 40b for this purpose, and cooperate with mating guidance means 44, particularly a groove 44a in linear sliding section 16b. To assist with mounting brake band holder 15, cutaways 46 are provided in linear sliding section 16b as far as groove 44a, through which protrusions 42a may engage. Movable brake band holder 15 is then retained in housing 10 in positive locking manner by pushing in a linear direction. The subsequent operating mode of the brake band holder 15 that is movable in linear direction is exactly the same as the brake band holder 15 of FIGS. 1-6 that is movable in rotating manner.

In conclusion, it should be noted that the technical features described in the aforegoing may be used individually or in any

The invention claimed is:

1. A braking device (100) for braking or immobilising a shaft (11) for a work tool (35), comprising:
   a brake band (13) that has two ends and surrounds an area of the shaft (11) such that the ends form an overlapping area, wherein the brake band (13) has a narrower width in the overlapping area than in the rest of the brake band (13) such that the two ends of the brake band (13) are disposed in an effective plane (14); and
   two brake band holders (15, 26), each retaining one of the two ends of the brake band (13) in the effective plane (14), via which the brake band (13) may be tensioned or released characterised in that at least one brake band holder (15) is mounted outside the effective plane (14) of the brake band (13) so as to be:
   rotatable about the shaft (11) axis;
   rotatable about a roughly parallel axis to the shaft (11); or
   movable in a plane roughly orthogonal with the shaft (11);
   wherein the at least one brake band holder (15) is mounted in the area of the shaft (11) by means of a linear guide, the linear guide including a linear sliding section (16b) and a bearing pin (40b), wherein the sliding section (16b) is present on the at least one brake band holder (15) as a mounting base (16) that is mounted on at least one bearing pin (40b) as a first counter bearing (40) so as to be movable in a linear direction, and wherein the mounting base (16) has at least one guidance means (42), which cooperates in positive locking manner with at least one mating guidance means (44) of the first counter bearing (40).

2. The braking device as recited in claim 1, characterised in that the shaft (11) has a brake drum (12) that is connected in non-rotating manner to the shaft (11), wherein the brake drum (12) is at least partly surrounded by the brake band (13).

3. The braking device as recited in claim 1, characterised in that an axis of rotation (37) of the movable brake band holder (15) is arranged coaxially with an axis of rotation (37) of the shaft (11).

4. The braking device as recited in claim 1, characterised in that the at least one brake band holder (15) is subjected to a spring force on the brake band or on an additional spring, thereby placing the brake band (13) under tension in a rest position, in which the shaft (11) is prevented from rotating.

5. The braking device as recited in claim 4, characterised in that a strain relief operating against a spring force is exerted on the at least one brake band holder (15) so that in an operating position in which the shaft (11) is rotatable, the brake band (13) is not under tension.

6. The braking device as recited in claim 5, characterised in that the at least one brake band holder (15) has an attachment lug (20) offset axially to the mounting base (16) for retaining the brake band (13), wherein the mounting base (16) is constructed as a single part with the attachment lug (20).

7. The braking device as recited in claim 6, characterised in that the strain relief (27) engages with the attachment lug (20) of the at least one brake band holder (15).

8. The braking device as recited in claim 1, characterised in that the at least one brake band holder (15) is retained on a swivel guide by means of a bayonet connector.

9. The braking device as recited in claim 8, characterised in that the swivel guide includes a swivel ring (16a) and a swivel bearing (17a), wherein the swivel ring (16a) is provided as the mounting base (16) on the at least one brake band holder (15), and is mounted so as to be rotatable on the swivel bearing (17a) as a second counter bearing (17).

10. The braking device as recited in claim 1, characterised in that the at least one guidance means (42) of the mounting base (16) is formed by a protrusion (42a), and that the at least one mating guidance means (44) of the second counter bearing (17) is formed by a groove (44a), wherein the at least one guidance means (42) and the at least one mating guidance means (44) are reversible.

11. The braking device as recited in claim 10, characterised in that cutaways (46) are provided in the groove (44a) for the protrusions (42a), so that the mounting base (16) can be mounted on the first counter bearing (40) and a positive locking bearing is formed between the mounting base (16) and the first counter bearing (40).

12. The braking device as recited in claim 1, characterised in that the at least one brake band holder (15) is secured axially on a guide by a bayonet connector.

13. The braking device as recited in claim 1, characterised in that both brake band holders are constructed so as to be movable.

14. The braking device as recited in claim 1, characterised in that the at least one brake band holder (15) is made from a cast part.

15. A hand-held implement having a powered work tool (35) and a braking device (100) as recited in claim 1 for slowing or immobilising the tool (35).

16. The braking device as recited in claim 14, characterized in that the at least one brake band holder (15) is made from a precision cast part.

* * * * *